(12) United States Patent
Welingkar

(10) Patent No.: US 7,783,993 B2
(45) Date of Patent: Aug. 24, 2010

(54) CONTENT-BASED NAVIGATION AND LAUNCHING ON MOBILE DEVICES

(75) Inventor: Bharat Welingkar, Los Altos, CA (US)

(73) Assignee: Palm, Inc., Sunnyvale, CA (US)

( * ) Notice: Subject to any disclaimer, the term of this patent is extended or adjusted under 35 U.S.C. 154(b) by 360 days.

(21) Appl. No.: 11/234,540

(22) Filed: Sep. 23, 2005

(65) Prior Publication Data

US 2007/0083906 A1   Apr. 12, 2007

(51) Int. Cl.
*G06F 3/14*   (2006.01)

(52) U.S. Cl. ........................ 715/864; 715/206

(58) Field of Classification Search ............... 345/418; 715/513, 779, 864, 206; 709/236
See application file for complete search history.

(56) References Cited

U.S. PATENT DOCUMENTS

| | | | |
|---|---|---|---|
| 5,802,531 A | 9/1998 | Lamiraux et al. | |
| 5,862,372 A | 1/1999 | Morris et al. | |
| 5,969,755 A | 10/1999 | Courtney | |
| 6,040,829 A * | 3/2000 | Croy et al. ............... | 715/864 |
| 6,067,541 A | 5/2000 | Raju et al. | |
| 6,199,060 B1 | 3/2001 | Gustman | |
| 6,247,135 B1 | 6/2001 | Feague | |
| 6,342,901 B1 | 1/2002 | Adler et al. | |
| 6,353,851 B1 | 3/2002 | Anupam et al. | |
| 6,367,078 B1 | 4/2002 | Lasky | |
| 6,381,618 B1 | 4/2002 | Jones et al. | |
| 6,400,996 B1 | 6/2002 | Hoffberg et al. | |
| 6,418,424 B1 | 7/2002 | Hoffberg et al. | |
| 6,424,370 B1 | 7/2002 | Courtney | |
| 6,545,209 B1 | 4/2003 | Flannery et al. | |
| 6,593,945 B1 * | 7/2003 | Nason et al. ............. | 715/779 |
| 6,678,680 B1 | 1/2004 | Woo | |
| 6,693,652 B1 | 2/2004 | Barrus et al. | |
| 6,748,395 B1 | 6/2004 | Picker et al. | |
| 6,795,826 B2 | 9/2004 | Flinn et al. | |
| 6,829,668 B2 | 12/2004 | Keskar et al. | |
| 6,847,966 B1 | 1/2005 | Sommer et al. | |
| 6,913,466 B2 | 7/2005 | Stanfield et al. | |
| 6,963,975 B1 | 11/2005 | Weare | |

(Continued)

OTHER PUBLICATIONS

Stanski et al., Proceedings of the 1998 ACM symposium on Applied Computing, pp. 400-404, 1998.*

(Continued)

*Primary Examiner*—Cheyne D Ly
(74) *Attorney, Agent, or Firm*—Fenwick & West LLP

(57) ABSTRACT

Techniques are disclosed for a content-based navigation and launching for portable computing devices such as PDAs and smart phones. A content navigator and launcher allows a user to personalize content groupings. The techniques can run on top of any OS file system that has a mechanism to associate files with their creating applications. Personalization of the content-based navigation and launching scheme can be set-up on the user's work station, and then transmitted and synchronized with a target mobile device. A central server can be used to carry out content harvesting and/or configuring the personalization scheme. The content and/or personalization scheme can then be pushed on to the mobile device (e.g., via a GSM network or other suitable communication link). APIs can be used by application vendors to register the content types of their own choice. A preferences utility allows users to manage the content types and associations.

13 Claims, 8 Drawing Sheets

U.S. PATENT DOCUMENTS

| | | |
|---|---|---|
| 6,976,030 B2 | 12/2005 | Lee et al. |
| 7,010,537 B2 | 3/2006 | Eyal et al. |
| 7,185,316 B1 | 2/2007 | Morris et al. |
| 7,305,420 B2 | 12/2007 | Mathias |
| 2001/0004260 A1* | 6/2001 | Bauer et al. ............... 345/418 |
| 2002/0016853 A1* | 2/2002 | Ressler ..................... 709/236 |
| 2002/0069264 A1 | 6/2002 | Pasquali |
| 2002/0087603 A1 | 7/2002 | Bergman et al. |
| 2002/0091697 A1* | 7/2002 | Huang et al. ................ 707/10 |
| 2002/0091917 A1* | 7/2002 | Liao ........................... 713/1 |
| 2002/0123912 A1 | 9/2002 | Subramanian et al. |
| 2002/0133627 A1 | 9/2002 | Maes et al. |
| 2002/0174180 A1* | 11/2002 | Brown et al. ............... 709/203 |
| 2002/0181711 A1 | 12/2002 | Logan et al. |
| 2003/0013483 A1* | 1/2003 | Ausems et al. ............. 455/556 |
| 2003/0046331 A1* | 3/2003 | O'Donnell ................. 709/201 |
| 2003/0144004 A1 | 7/2003 | Canova et al. |
| 2003/0172113 A1 | 9/2003 | Cameron et al. |
| 2003/0204815 A1* | 10/2003 | Edwards et al. ............ 715/513 |
| 2004/0078265 A1 | 4/2004 | Subramanian et al. |
| 2004/0174398 A1* | 9/2004 | Luke et al. ................. 345/856 |
| 2004/0218900 A1 | 11/2004 | Yoon et al. |
| 2004/0255235 A1 | 12/2004 | Jung et al. |
| 2004/0267753 A1 | 12/2004 | Hoche |
| 2005/0060653 A1 | 3/2005 | Fukase et al. |
| 2005/0108297 A1 | 5/2005 | Rollin et al. |
| 2005/0210079 A1 | 9/2005 | Edlund et al. |
| 2005/0216522 A1 | 9/2005 | Gomes et al. |
| 2005/0216524 A1 | 9/2005 | Gomes et al. |
| 2006/0004799 A1* | 1/2006 | Wallender .................. 707/100 |
| 2006/0041893 A1 | 2/2006 | Castro et al. |
| 2006/0085382 A1* | 4/2006 | Moon ........................... 707/1 |
| 2006/0174210 A1 | 8/2006 | Richards et al. |
| 2007/0245223 A1 | 10/2007 | Siedzik et al. |
| 2007/0245229 A1 | 10/2007 | Siedzik et al. |
| 2007/0283287 A1 | 12/2007 | Taylor et al. |

OTHER PUBLICATIONS

Eckstein et al., "Chapter 1: Drag and Drop," Java Swing, Sep. 1998, pp. 1-56, O'Reilly Media.

PCT International Search Report and Written Opinion, PCT/US06/37309, Jul. 18, 2008, 9 pages.

* cited by examiner

CONTENT-BASED NAVIGATION AND LAUNCHING ON MOBILE DEVICES

RELATED APPLICATIONS

This application is related to U.S. application Ser. No. 11/130,593, filed May 16, 2005, titled "Interface for Synchronization of Documents Between a Host Computer and a Portable Device", which is herein incorporated in its entirety by reference.

FIELD OF THE INVENTION

The invention relates to hand-held mobile devices, and more particularly, to launching of applications and data access on mobile devices.

BACKGROUND OF THE INVENTION

Conventional portable computing devices such as personal digital assistants (PDAs), cell phones, and smart phones typically include a number of applications, such as email, camera, word processor, and camcorder. An application launcher is designed to display the available applications, and to launch the applications upon user request. The application launcher usually employs a graphical user interface to facilitate interaction with the user.

In more detail, the user accesses the applications menu of the launcher (e.g., icons for each selectable application), and then selects the desired application (e.g., using a stylus, navigation controls, or a touch screen). The application is then launched. Once the application is running, the user can use that application to select corresponding data sources to work on or otherwise use. These data sources could be, for example, a list of emails, photographs, text documents, or video files (depending on the particular application that is running). To access any one particular data source, the user has to navigate to the desired data source, and select that source to open it in the already running application.

There are a number of problems associated with such application-based launching and data source access techniques. For example, such conventional techniques can be inefficient if there are multiple data sources (e.g., emails, text messages, and voicemails), where each source requires a different application to be launched. This is particularly a problem for devices having minimalistic or otherwise limited memory and/or processing capability, where only one application can be loaded and running at any one time. Many mobile devices fall into this category. In addition, conventional application-based launching and data access requires a significant number of steps for users to access the desired content. This can result in frustration as well as loss of valuable time, thereby discouraging an application rich environment in the context of mobile devices.

Some desktop operating systems allow the user to see a list of documents, where the user can select any one document and cause the corresponding application to launch. However, the functionality provided by these operating systems is limited. For instance, the user cannot personalize the display of how the data sources are listed. Nor can the user easily categorize how the data sources are stored. Moreover, such systems typically show only documents that are supported by the system (non-supported documents are not included in the view).

What is needed, therefore, are techniques for efficiently accessing data sources on mobile devices in a user-friendly manner.

SUMMARY OF THE INVENTION

One embodiment of the present invention provides a portable computing device configured for content-based navigation and launching on a portable computing device. The device includes a processor for executing one or more sets of instructions to carry out desired functionality of the portable computing device. The device also includes a content navigator module executable by the processor, and for allowing a user to customize a content-based launching pad, whereupon unrelated types of digital content files are grouped into user-created categories, thereby enabling content-based navigation and launching on the portable computing device. In one such embodiment, each category of the content-based launching pad includes one or more hyperlink descriptions of content, and the user can select a particular hyperlink description of digital content to launch an application associated with that content. The unrelated types of digital content files can be grouped into user-created categories without the content files having any knowledge of an operating system by which they are categorized. The portable computing device can be, for example, one of a personal digital assistant (PDA), a cellular telephone, a smart phone, or a hand-held mobile device configured to communicate by a wireless or wired network. The device may include a database of choices and preferences relative to a personalized content-based navigation and launching scheme of the user. The device may include at least one of a generic document viewer, an application, a media player, a browser, and a reader. The customized content-based launching pad can be setup, for example, by the user on a host computing device and then synchronized to the portable computing device.

Another embodiment of the present invention provides a server configured for content-based navigation and launching on portable computing device. The server includes a processor for executing one or more sets of instructions to carry out desired functionality of the server. The server also includes a content personalization engine executable by the processor, and for allowing a user to subscribe desired digital content for downloading to a portable computing device via a wireless or wired network. The content personalization engine operates in conjunction with a content navigator module of the portable computing device to allow a user to customize a content-based launching pad, whereupon unrelated types of digital content files are grouped into user-created categories, thereby enabling content-based navigation and launching on the portable computing device. The customized content-based launching pad can be setup by the user on a host computing device communicatively coupled with the server, and then synchronized to the portable computing device. The server may include a content production engine for harvesting targeted online digital content. In one such embodiment, the content production engine queues various digital content for users that have subscribed it via personal choices, as noted in the content personalization engine.

Another embodiment of the present invention provides a system configured for content-based navigation and launching on a portable computing device. The system includes a portable computing device configured with a content navigator module for allowing a user to customize a content-based launching pad, whereupon unrelated types of digital content files are grouped into user-created categories, thereby enabling content-based navigation and launching on the portable computing device. The system also includes a server configured with a content personalization engine that operates in conjunction with the content navigator module, for allowing a user to subscribe desired digital content for downloading to the portable computing device via a wireless or wired network. In one such system embodiment, each category of the content-based launching pad includes one or more hyperlink descriptions of content, and the user can select a particular hyperlink description of digital content to launch an application associated with that content. The unrelated types of digital content files can be grouped into user-created categories without the content files having any knowledge of an operating system by which they are categorized. The portable computing device can be, for example, one of a personal digital assistant (PDA), a cellular telephone, or a smart phone. The portable computing device may further include a database of choices and preferences relative to a personalized content-based navigation and launching scheme of the user. The customized content-based launching pad can be setup by the user on a host computing device communicatively coupled with the server, and then synchronized to the portable computing device. The server may include a content production engine for harvesting targeted online digital content. In one such embodiment, the content production engine queues various digital content for users that have subscribed it via personal choices, as noted in the content personalization engine.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

Note that the figures use like reference numerals to identify like elements.

DETAILED DESCRIPTION OF THE INVENTION

Techniques are disclosed for efficiently accessing multiple data sources on portable computing devices in a user-friendly manner. These techniques can be employed, for example, to provide personalized content-based navigation and launching on cell phones, smart phones, PDAs, and other mobile devices.

One particular embodiment of the present invention creates subject-specific or content-specific associations that make a user's digital content more readily accessible. For instance, functionally unrelated types of digital content/applications can be grouped into human-logical categories without the applications or content files having any knowledge of the system by which they are categorized. The user can personalize these groupings (e.g., by subject matter area unique to a particular enterprise), and can further create sub-categories within each main category for storing the content/applications in a readily accessible, personalized and hierarchal structure. The techniques can run on top of any OS file system that has a mechanism (e.g., such as the PalmOS Exchange Manager) to associate files with their creating applications.

If so desired, personalization of the content-based navigation and launching scheme can be set-up on the user's work station (e.g., desktop or laptop), and then transmitted and synchronized with a target mobile device. In such a case, an existing content-based navigation and launching scheme would be updated as needed during the synchronization process. In an enterprise system, a central server can be used to carry out content harvesting and/or configuring the personalization scheme. In such a case, the content and/or personalization scheme can be pushed on to the portable computing device (e.g., via a GSM/CDMA network, wi-fi network, hard wired connection link, or other suitable communication link).

System Architecture

Figure 1:
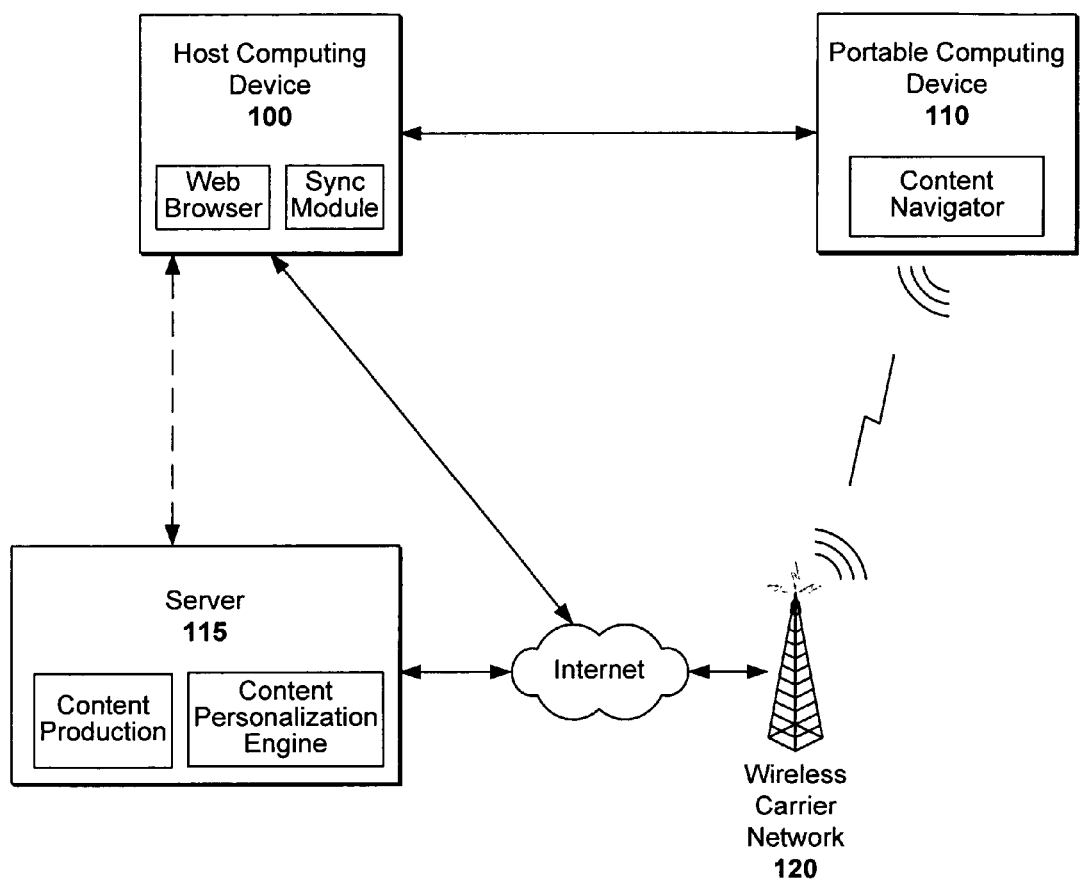
FIG. 1 is a block diagram of an enterprise system configured for enabling content-based navigation and launching on portable computing devices, in accordance with an embodiment of the present invention.

FIG. 1 is a block diagram of an enterprise system configured for enabling content-based navigation and launching on portable computing devices, in accordance with an embodiment of the present invention.

As can be seen, the system includes a host computing device 100, a portable computing device 110, and a server 115. The server 115 is communicatively coupled to the portable computing device 110 via the Internet and a wireless carrier network 120. The host computing device 100 can be coupled to the portable computing device 110 via a synchronization link (e.g., wired or wireless), and can also access the Internet (or other wide area network) as is conventionally done using wired or wireless communication links. There may also be a local area network coupling the host computing device 100 and server 115, which can be implemented, for instance, using conventional wired and/or wireless communication links. Numerous other system configurations will be apparent in light of this disclosure.

The host computing device 100 can be, for example, a conventional personal computer such as a desktop or laptop computer, or any other type of computing device. In this embodiment, the host computing device 100 includes a web browser (or other similar application) that allows the host computing device 100 to interface and communicate with other devices and systems on the network. Example browsers include Microsoft's Internet Explorer browser, Netscape's Navigator browser, Mozilla's Firefox browser, or any other browsing or application software capable of communicating via a network. The host computing device 100 also includes a synchronization module for managing the exchange and synchronization of data between the host computing device 100 and the portable computing device 110. An example host computing device 100 architecture will be discussed in more detail with reference to FIG. 2a.

The portable computing device 110 can be, for example, a personal digital assistant (PDA), a cellular or satellite telephone, a smart phone, a media player device, or other such mobile device configured to communicate by the wireless carrier network 120 (e.g., GSM, CDMA, or other wireless network). Note that the portable computing device 110 can also be configured to communicate via the Internet and/or other wired networks. In any case, the portable computing device 110 includes a content navigator module, which allows the user to set-up and carry out content-based navigation and launching. An example portable computing device 110 architecture will be discussed with reference to FIG. 2c.

The portable computing device 110 is capable of communicating with the host computing device 100 to carry out synchronization, and to otherwise transfer data therebetween. For example, a user may work on a document on the host computing device 100, and then transfer the document to the portable computing device 110 so that the document can be accessed and worked on while the user is traveling. The user may subsequently transfer the updated document on the portable computing device 110 back to the host computing device 100 via the communication link therebetween, if so desired. The communication link may be implemented with wired (e.g., RS-232, USB) or wireless (e.g., infrared, 802.11, Bluetooth) technology.

The server 115 provides a central management function, and includes a content personalization engine. The content personalization engine can be configured, for example, to provide content in a variety of formats that can be subscribed to and downloaded. The server 115 can also be configured to perform content production using various sources (e.g., Internet websites, intranet databases, information services such as Reuters). An example server 115 architecture will be discussed in more detail with reference to FIG. 2b.

Host Computing Device

Figure 2A:
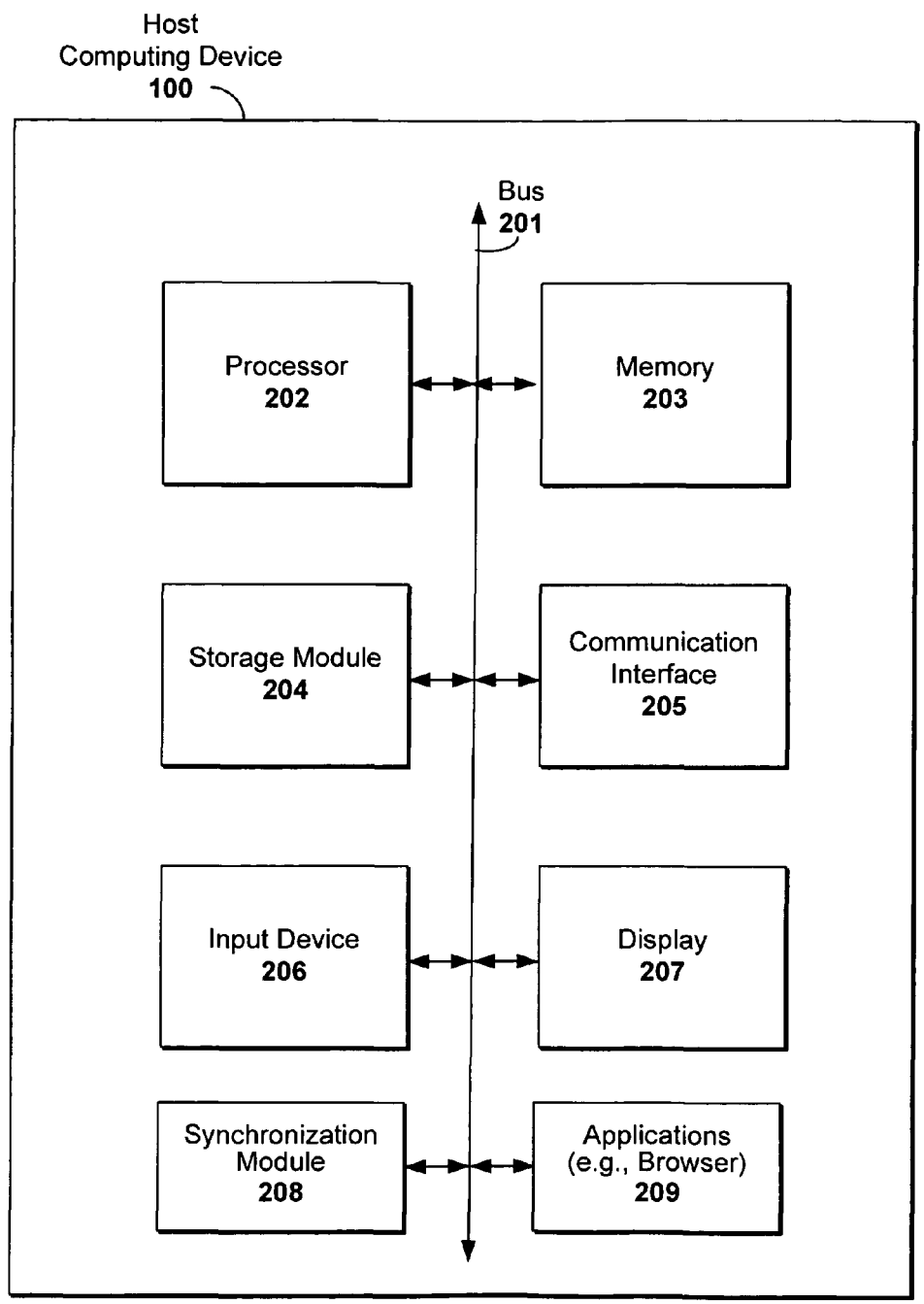
FIG. 2a illustrates a host computing device of the system shown in FIG. 1, configured in accordance with an embodiment of the present invention.

FIG. 2a illustrates a host computing device of the system shown in FIG. 1, configured in accordance with an embodiment of the present invention. In this particular example configuration, the host computing device 100 is a general purpose personal computer including a processor 202 (e.g., CPU or microcontroller), a memory 203 (e.g., RAM or other suitable computing memory), a storage module 204 (e.g., hard disk drive), a communication interface 205, an input device 206 (e.g., keyboard, mouse, and the like), a display 207, a synchronization module 208, and a number of applications 209 (e.g., web browser). Inter-process communication can be carried out as needed through data bus 201.

The communication interface 205 may include one or more interfaces used to communicate with the portable computing device 110 and exchange and synchronize data between each other. The communication interface 205 may be, for example, a USB interface, a serial interface, a parallel interface, a Bluetooth interface, a WiFi (e.g., IEEE 802.11) interface, an infrared interface, a cellular telephone interface, or any other type of wired or wireless communication interface. The storage module 204 stores the data management software that is run by the processor 202 in conjunction with the memory 203 to manage the synchronization and exchange of data between the host computing device 100 and the portable computing device 110. The processor 202 generally controls the host computing device 100, by executing the various modules to carry out functionality described herein.

The synchronization module 208 is configured for managing the exchange and synchronization of data between the host computing device 100 and the portable computing device 110. The synchronization of data allows both the host computing device 100 and the portable computing device 110 to have the most updated/recent version of desired content (hierarchy of source files). For example, in one particular embodiment, synchronization includes synchronizing contacts and/or a content-based launcher personalization scheme. Synchronization may occur, for instance, in response to a command by the user (e.g., pressing a button or making a menu selection), automatically at a predetermined timing tracked by a timer application, or any time when the portable computing device 110 is connected to the host computing device 100 via a wired or wireless communication link.

Additional detail on the synchronization process is provided in the previously incorporated U.S. application Ser. No. 11/130,593. A similar mechanism can be applied to synchronize many types of information between the portable computing device 110 and the host computing device 100, including synchronization of a content-based launcher personalization scheme between a host computing device 100 and a portable computing device 110, in accordance with an embodiment of the present invention.

The host computing device 100 may include other modules and functionality, as will be apparent in light of this disclosure. For instance, the host computing device 100 may include a database administrator client that allows an administrator or other user to open a user table (or other structure that lists users and their respective access rights) maintenance window, and to locate a target user record, and to assign/de-assign specific user rights to that record.

Server

Figure 2B:
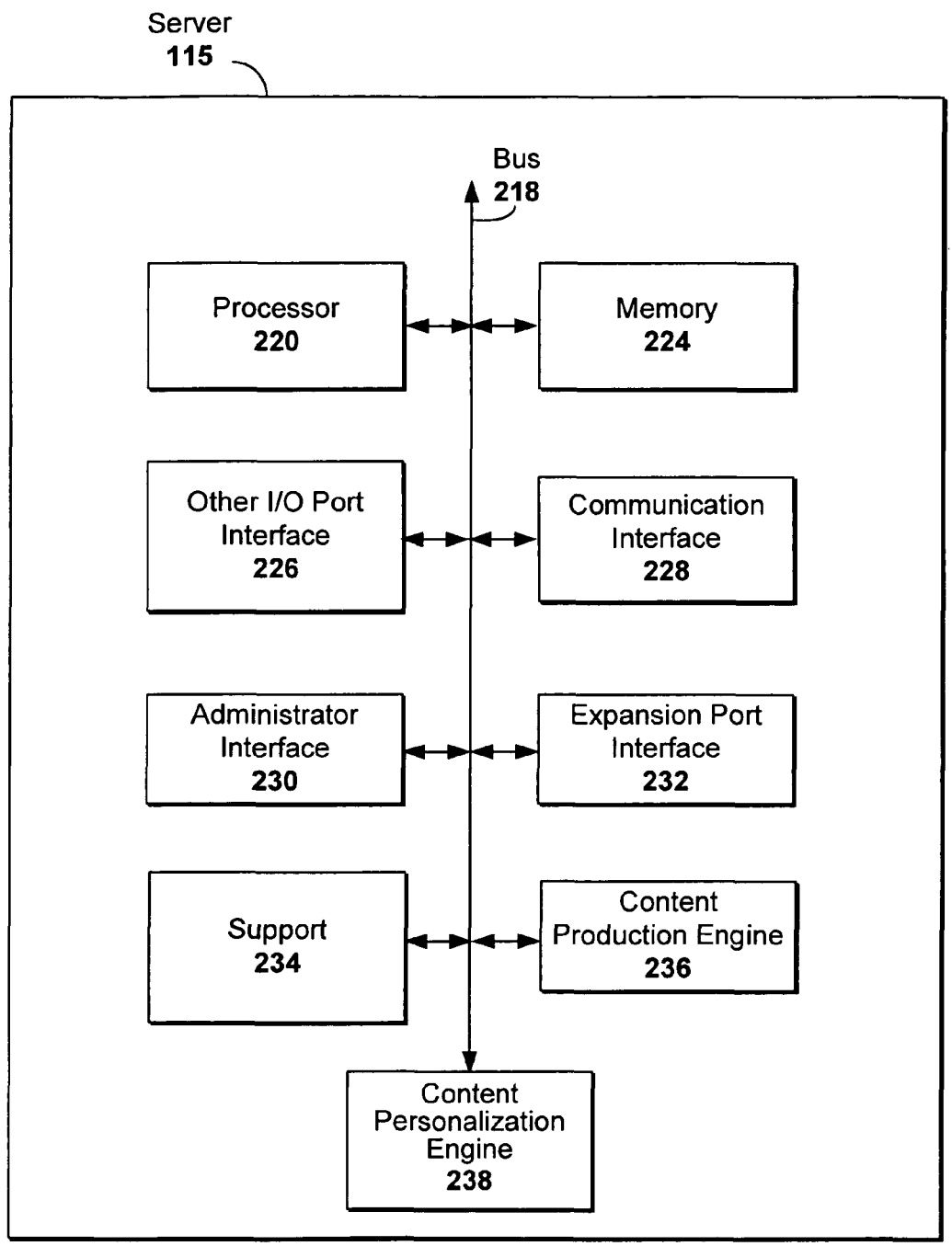
FIG. 2b illustrates a server of the system shown in FIG. 1, configured in accordance with an embodiment of the present invention.

FIG. 2b illustrates a server of the system shown in FIG. 1, configured in accordance with an embodiment of the present invention. The server 115 includes a processor 220 (e.g., CPU or microcontroller), an other I/O port interface 226, a memory 224 (e.g., RAM or other suitable computing memory), a communication interface 228, an expansion port interface 232, an administrator interface 230, a support module 234, a content production engine 236, and a content personalization engine 238. Each of the components of the portable computing device 110 may communicatively couple through data bus 218.

The processor 220 generally controls the server 115, by executing the various modules to carry out functionality described herein. The one or more other I/O port interfaces 226 can include interfaces for data connections such as USB, IEEE 1394, and the like. The expansion port interface 232 is configured to interface with an expansion or media card (e.g., compact flash cards, multi-media cards, SDIO cards, and the like). The communication interface 228 can be configured for network connections to a wide range of networks (e.g., local Bluetooth or 802.11 or long range cellular or data), as conventionally done.

The content production engine 236 can be programmed or otherwise configured to harvest targeted online content during off-peak hours (e.g., 2 am to 3 am), and can patch to device software components and instructions for web crawling and other content harvesting techniques. The content production engine 236 can harvest content-based on user and/or administrator preferences, and then create or assemble a content document for future offline viewing in variety of formats (e.g., Word, Excel, PDF, plucked websites, eBooks, audio/video clips, etc). For instance, in one embodiment, the content production engine 236 is implemented using Plucker, which is an open source API. In particular, Plucker provides a set of tools for transferring and compressing web pages and other HTML or text documents to a mobile device for reading. The Plucker tool kit is available for a number of operating systems, such as Unix and Linux, Windows, and Mac. Plucker also provides a document viewer for mobile devices. Other conventional and/or custom content generation mechanisms can also be used here. Note that the server 115 can be configured to perform content production using various sources (e.g., Internet websites, intranet or other accessible databases, and information services such as Reuters). Further detail of the content production engine 236 is discussed with reference to FIG. 5.

The administrator interface 230 can also be implemented with conventional or custom technology, and can be configured for centralized maintenance of content, as well as for provisioning new applications, wizards for installing/configuring device component bundles, FAQs, support information, and other administrator functions. The support module 234 can be used to supplement the administrator functions by essentially providing a self-help function. For instance, the support module 234 can be configured with software download and install wizards, support tools, knowledgebase, and other such self help mechanisms that may help users achieve targeted goals. The support module 234 can also be configured for device provisioning. In one such embodiment, the support module 234 includes hardware feature-based, image-driven software bundles that are pre-configured and can be downloaded and installed via a wireless or wired connection (e.g., HotSync).

The content personalization engine 238 provides the user with access to the available content and/or tools, and enables the user to select the desired content and tools for downloading to the portable computing device 110 (e.g., via the content navigator). In general, the user employs the content navigator to choose subscription or de-subscription of the available content, company provided optional content, or create personal content choices or links for harvesting. The content can be provided to the user, for example, as a normalized list of content in a variety of formats (e.g., Word documents, Excel worksheets, PDF documents, plucked offline books, eBooks, audio clips, training videos, web URLs, custom PalmOS apps, etc) that can be subscribed to (or unsubscribed from) and downloaded. Further detail of the content personalization engine 238 is discussed with reference to FIGS. 4a and 4b.

The server 115 may also include other functionality, as will be apparent in light of this disclosure. In one particular configuration, the server can be configured to provide a comprehensive website accessible to employees of the enterprise-employer. Information such as announcements, alerts, and what's new, can be posted. Also, support queries, as well as administration and content rules can be posted. The server 115 may include a structured database or other content repository for holding all acquired content. The server 115 may include content generation capability (e.g., HTML content generation, Word/Excel/PDF content generation, eBook content generation, and audio/video content generation). In general, the server 115 may include any information useful to a given enterprise that can be posted or otherwise made accessible to users via the server 115. The server 115 may include an operating system scheduler configured, for example, to wake-up pursuant to a predetermined schedule, and to execute various modules for carrying out desired functions such as content generation during off-peak hours.

Portable Computing Device

Figure 2C:
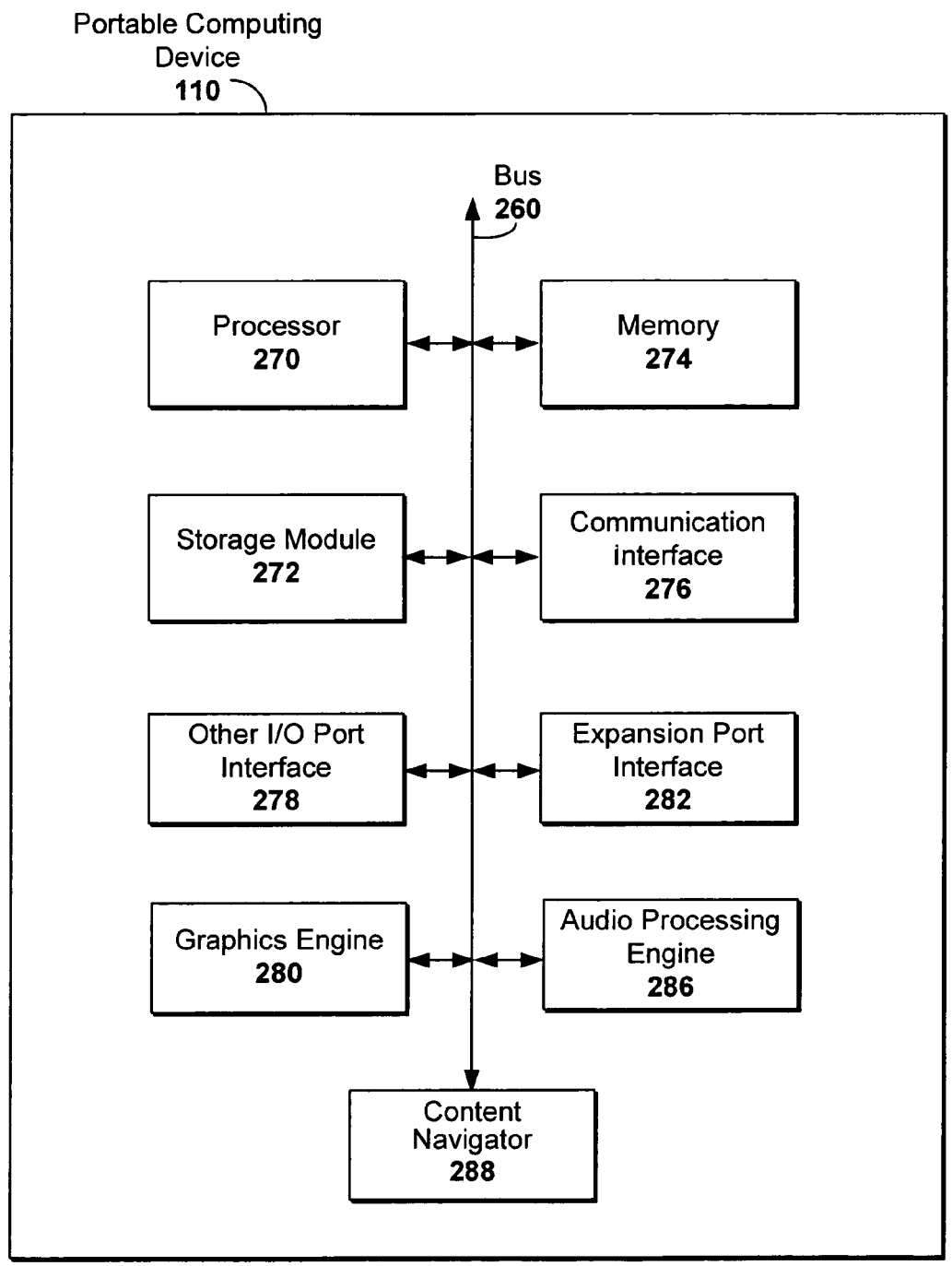
FIG. 2c illustrates a portable computing device of the system shown in FIG. 1, configured in accordance with an embodiment of the present invention.

FIG. 2c illustrates a portable computing device of the system shown in FIG. 1, configured in accordance with an embodiment of the present invention. The portable computing device 110 includes a processor 270 (e.g., CPU or microcontroller), a storage module 272, a memory 274 (e.g., RAM or other suitable computing memory), a communication interface 276, an expansion port interface 282, one or more other input/output (I/O) port interfaces 278, an optional graphics engine 280, an audio processing engine 286. Each of the components of the portable computing device 110 may communicatively couple through data bus 260.

Just as with processors 202 and 220, processor 270 can be implemented with a conventional processor or controller. The processor 270 generally controls the portable computing device 110, by executing the various modules to carry out functionality described herein. The expansion port interface 282 is configured to interface with an expansion or media card, as previously discussed with reference to server 115. The optional graphics engine 280 may include hardware (e.g., graphics chip) in addition to software to enhance graphics for display on the display screen of the portable computing device 110.

The audio processing engine 286 can be configured, for example, for audio related processing such as recording and playback, and include appropriate hardware (e.g., microphone, speaker, and/or jacks for such connections) and software (e.g., sound controls, channel control, and the like). The communication interface 276 can be configured for network connections to a wide range of networks, as conventionally done. The one or more other I/O ports 278 can include interfaces for data connections such as USB, IEEE 1394, and the like.

The content navigator 288, in conjunction with the content personalization engine 238 of the server 115, allows the user to customize a content-based launching pad on the portable computing device 110. In one particular embodiment, content navigator 288 is programmed or otherwise configured to provide a one-stop launching pad for mobile office functions, enterprise applications, and corporate information in a configurable environment. The content navigator 288 will be discussed in more detail with reference to FIG. 6.

The portable computing device 110 may also include other functionality and modules as well. For instance, the portable computing device 110 may include generic document viewers, applications, media players, browsers (e.g., OpenWave browser or other mobile device browser), and readers (e.g., Acrobat for Palm, Docs-to-go, PalmReader, Plucker, Kinoma, Margi, etc). Likewise, the portable computing device 110 may include infrastructure tools (e.g., PicoConnect, VPN client, security/virus tools, email/PIM client). The portable computing device 110 may also include a database of personalized choices and preferences relative to that particular user's content-based navigation and launching scheme.

In one particular embodiment, the portable computing device 110 uses a local dash board or "content launching pad" to drive choices on the screen of the device 110. Further personalization can be done via utility services applications on the web. The user can download the dash board, for instance, via a wired (e.g., sync cable) connection, or via a wireless connection using an update option of the content navigator 288. Thus, the dashboard shows documents/content rather than applications, thereby allowing the user to click on the content of interest. The dashboard view is built based on user preferences. This is in contrast to other conventional mechanisms (e.g., such as Windows Explorer), where files are listed by type, name, or date. Such conventional mechanisms provided no personalization and customization of a user's content launching pad on a portable computing device.

The portable computing device 110 may include other typical mobile device features as well, such as a display, a screen navigation interface, an expansion port or slot, a stylus, a microphone, and one or more control buttons (e.g., volume slider/button, voice recorder button, screen rotation button, etc). In addition, note that the portable computing device 110 can be configured to use any number of operating systems, such as PalmOS or Windows Mobile or Linux-based operating systems.

Example Implementation Details

In one particular embodiment, the content launching pad includes three main categories: mobile office functions (e.g., PIM—personal information manager, campus map) enterprise applications/tools (e.g., Siebel eService, DW executive dashboards, SAP sales and logistics), and corporate information (e.g., intranet—sales and training material, Internet—selected syndicated free/pay content). Users can put in specific content in any category they want, without reference to which application launches that content. This personalized display and categorization of content allows the user easy access to diverse types of data, without first having to start the corresponding applications. In addition, and as previously described, the server 115 allows the employer to push content onto the portable computing device 110.

Figure 3:
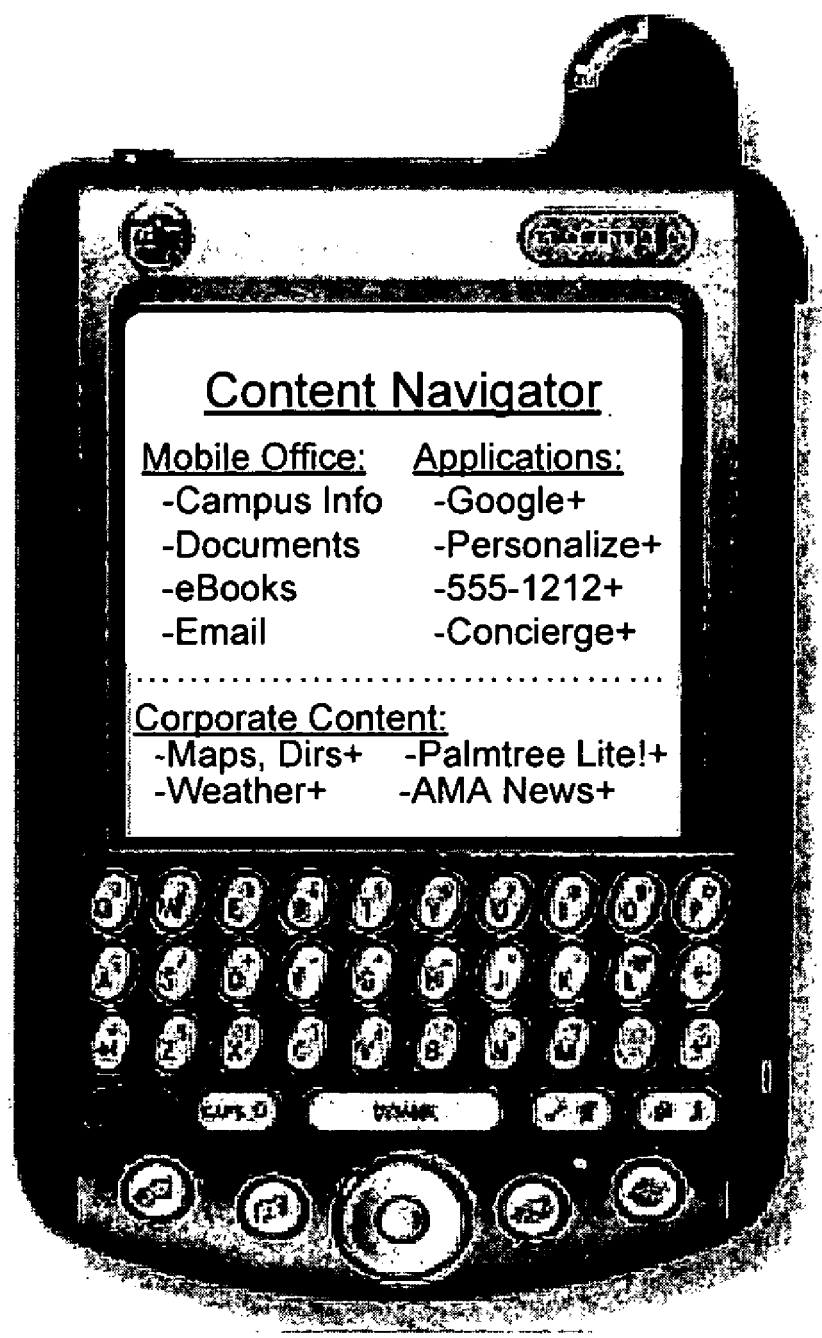
FIG. 3 illustrates an example navigation user interface for the portable computing device of the system shown in FIG. 1, configured in accordance with an embodiment of the present invention.

FIG. 3 illustrates an example navigation user interface for the portable computing device of the system shown in FIG. 1, configured in accordance with an embodiment of the present invention. As can be seen, there are three main categories: mobile office functions, applications, and corporate content. The mobile office category includes sub-categories of campus info (e.g., building directory), documents (e.g., Word/Excel/PowerPoint/PDF), Ebooks, and Email. The applications category includes sub-categories of search engines (e.g., Google link), content navigator (e.g., personalize link), information links (e.g., 555-1212), and a concierge. The corporate content category includes sub-categories of maps/directions, weather info, access to internal networks and infrastructure (e.g., Palmtree Lite!), and AMA news.

In one such embodiment, the portable computing device 110 includes a PalmOS operating system configured to provide modular implementation of the Exchange Manager. An API for the Exchange Manager can be seamlessly integrated in applications or PalmOS utilities, including the content navigator 288. As previously explained, the content navigator 288 allows users to categorize content (data) and display each piece of content by name. A hyperlink to each named piece of content can be used to invoke the associated application that is registered in the Exchange Manager. A preferences panel can be used to provide the ability to maintain content and application associations. Further, the conventional device launcher (application-based launcher) of the portable computing device 110 could be modified to have a preferences option to switch to content-based navigation, in accordance with an embodiment of the present invention. The personalized content-based navigation and launching preferences selected by the user can be stored in a data store (e.g., ROM or disk drive) of the portable computing device 110.

In any case, end users can customize the content choices displayed on the content navigator 288 launch pad, which may include any content type (e.g., PDF document, Word document, Excel document, Plucker eBook, PowerPoint document, images, Margi presentation, web URL addresses, custom application databases, etc). The user can navigate using a list, for example, that is either alphabetically sorted or by category (e.g., based on subject matter, such as marketing and engineering). Once the content is located in the categorized list, the user can click on the link to launch the content with its associated application.

Methodology

Figure 4A:
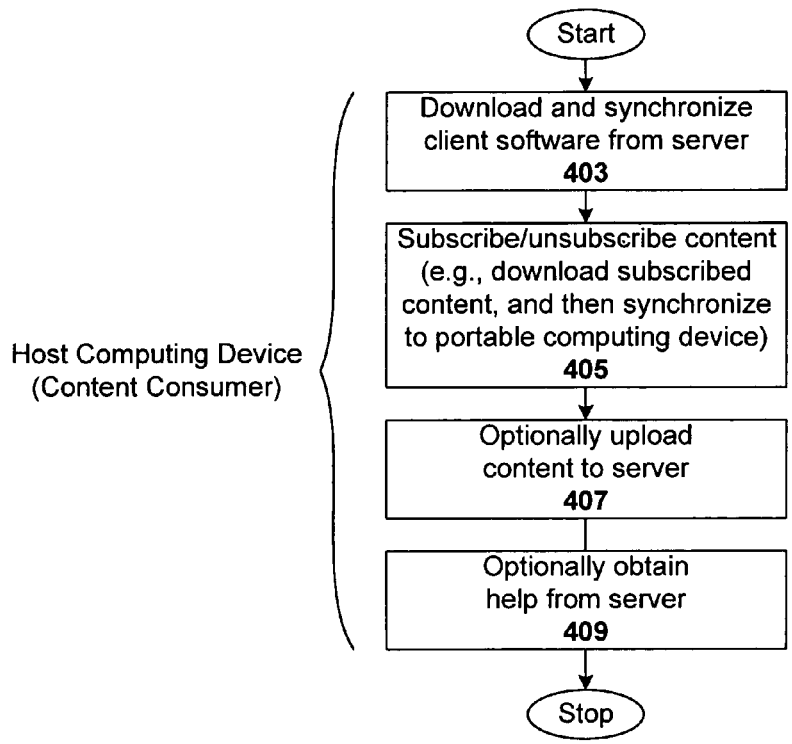
FIG. 4a illustrates a method for enabling content-based navigation and launching on portable computing devices, in accordance with an embodiment of the present invention.

FIG. 4a illustrates a method for enabling content-based navigation and launching on portable computing devices, in accordance with an embodiment of the present invention. This method can be carried out, for example, by the host computing device 100 of FIGS. 1 and 2a. The user can be, for example, the employee of an enterprise/company or other consumer. The user can perform any one or combination of these functions (403, 405, 407, and 409), and not necessarily in the sequence shown, as will be appreciated in light of this disclosure.

The method may include downloading and synchronizing 403 client software. In one particular embodiment, this is achieved as follows: open a browser window on the host computing device 100 (e.g., desktop/laptop); navigate to server 115 website (e.g., http://www.palm.com); navigate to appropriate client software download page (e.g., using download wizard); download the client software components; synchronize the software to portable device using the sync module 208 of the host computing device 100 (e.g., Palm HotSync), or other suitable synchronizing mechanism; and close the browser window when ready to exit.

The method may include subscribing/unsubscribing 405 content. In one particular embodiment, this is achieved as follows: open a browser window on the host computing device 100; navigate to server 115 website; navigate to content personalization engine 238 section of the website (e.g., under deployment page, click on personalization tab); login (e.g., enter user name/password for authentication, where upon successful login, existing personal content choices are displayed); subscribe/un-subscribe content choices from the available options (e.g., using checkbox scheme or other suitable user interface); if desired, choose manual download of personal choices and synchronize them to the portable computing device 110; logout of the application when done; and close the browser window when ready to exit.

The method may include uploading 407 content from the host computing device 100. In one particular embodiment, this is achieved as follows: open a browser window on the host computing device 100; navigate to server 115 website; navigate to content personalization engine 238 section of the website (e.g., under deployment page, click on personalization tab); login (e.g., enter user name/password for authentication, where upon successful login, existing personal content choices are displayed); navigate to personal links section of the content personalization engine 238 (or elsewhere on the website); upload new content from the host computing device 100 to the content personalization engine 238 of the server 115 (or delete existing content from the host computing device 100 or the content personalization engine 238); if desired, choose manual download of personal choices and synchronize them to the portable computing device 110; logout of the application when done; and close the browser window when ready to exit.

The method may include obtaining 409 help from the server 115. In one particular embodiment, this is achieved as follows: open a browser window on the host computing device 100; navigate to server 115 website; navigate to support section of the content personalization engine 238, or elsewhere on the website (e.g., under deployment page, click on support tab); choose the appropriate category of help information; access specific knowledge bulletin wizard (or other instuructional communication scheme) and follow the wizard instructions; and close the browser window when ready to exit.

Figure 4B:
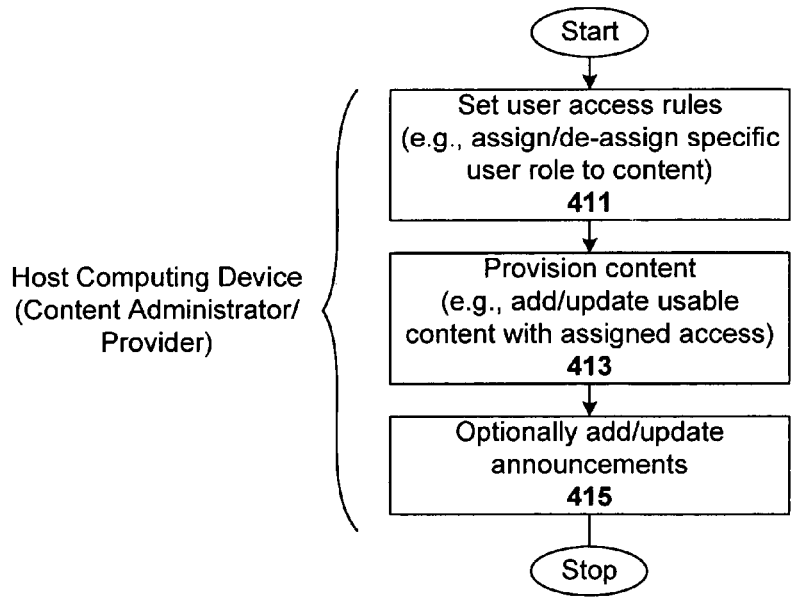
FIG. 4b illustrates a method for enabling content-based navigation and launching on portable computing devices, in accordance with another embodiment of the present invention.

FIG. 4b illustrates a method for enabling content-based navigation and launching on portable computing devices, in accordance with another embodiment of the present invention. Like the method of FIG. 4a, this method can be carried out by the host computing device 100 of FIGS. 1 and 2a. The user can be, for example, an administrator or content provider. The user can perform any one or combination of these functions (411, 413, and 415), and not necessarily in the sequence shown, as will be appreciated in light of this disclosure.

The method may include setting 411 access rules. In one particular embodiment, this is achieved as follows: open the database administrator client on the host computing device 100 (e.g., desktop/laptop); provide user credentials (e.g., administrative or super user username/password) to log in; open the user table maintenance window; locate the user record using first and/or last name; assign/de-assign specific user role (e.g., consumer with read-only capability, or administrator with read/write capability) to the located record; and logout of the database administrative client.

The method may include provisioning 413 content. In one particular embodiment, this is achieved as follows: open a browser window on the host computing device 100; navigate to server 115 website; navigate to content personalization engine 238 section of the website (e.g., under deployment page, click on personalization tab); login (e.g., enter user name/password for authentication, where upon successful login, if the user has "administrator" privileges, a link to access administration functions is displayed); click on the "Administration" link to proceed and all available content is displayed on the screen; add or update the content on the screen; logout of the application when done; and close the browser window when ready to exit.

The method may include adding/updating 415 announcements. In one particular embodiment, this is achieved as follows: open a browser window on the host computing device 100; navigate to server 115 website; navigate to content personalization engine 238 section of the website (e.g., under deployment page, click on personalization tab); login (e.g., enter user name/password for authentication, where upon successful login, if the user has "administrator" privileges, a link to access administration functions is displayed); click on the "Administration" link and navigate to the "add/update announcements" section; add or update announcements; logout of the application when done; and close the browser window when ready to exit.

Figure 5:
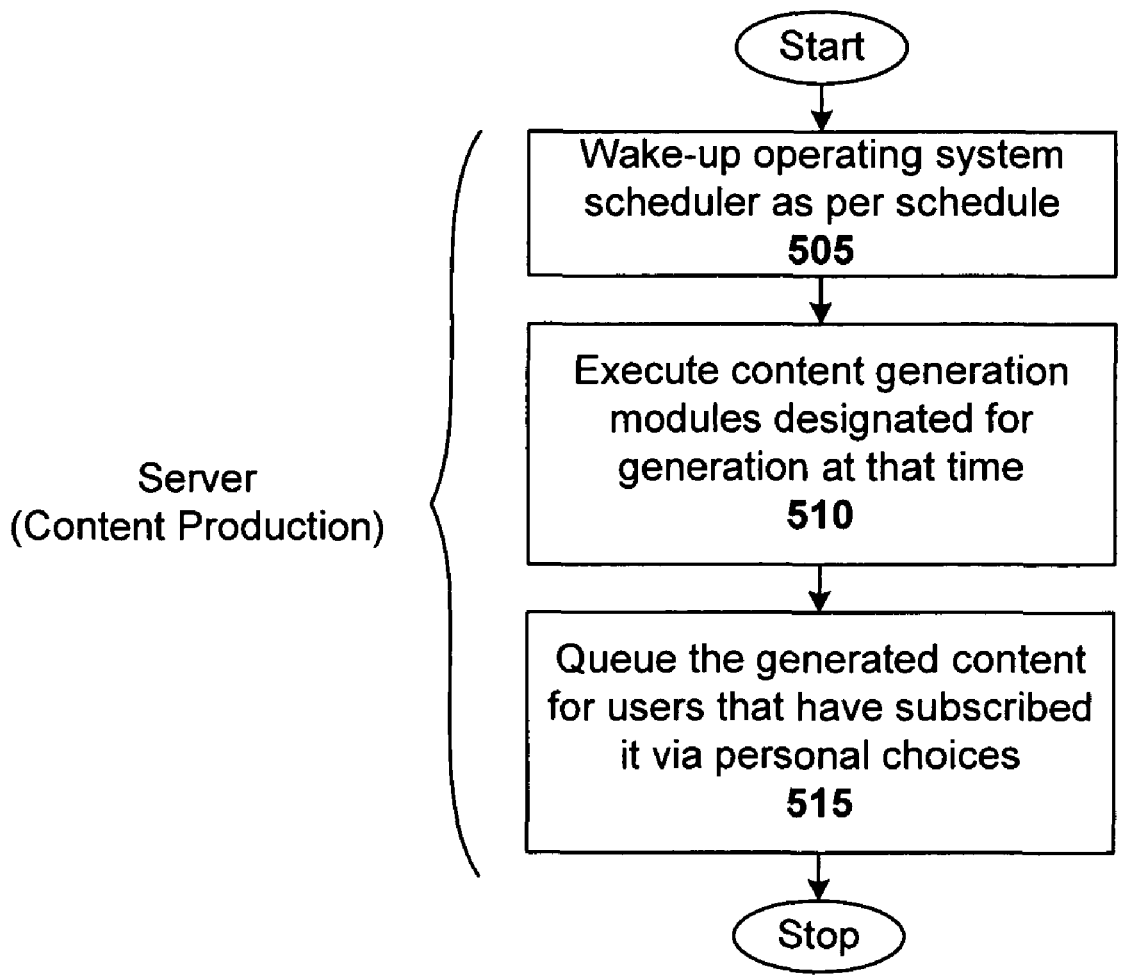
FIG. 5 illustrates a method for generating content so as to enable content-based navigation and launching on portable computing devices, in accordance with another embodiment of the present invention.

FIG. 5 illustrates a method for generating content so as to enable content-based navigation and launching on portable computing devices, in accordance with another embodiment of the present invention. This method can be carried out, for example, by the server 115 of FIGS. 1 and 2b.

The method begins with the operating system scheduler on the server 115 waking-up 505 as per schedule, and executing 510 content generation modules designated for generation at that time. Depending upon the type of content and output type (e.g., Word, Excel, PowerPoint, PDF, Plucker, eBook, audio, video, etc), different content generation modules can be used. In alternative embodiments, a single module (e.g., content production engine 236) can be programmed or otherwise configured to handle each of the content types (e.g., using a number of selectively called subroutines). Upon generation, the method continues with queuing 515 the generated content for the employees that have subscribed it via personal choices, as noted in the content personalization engine 238. In addition, the generated content can be made generally available for download. The method then proceeds with the scheduler going 520 back to sleep once the content generation is completed.

Figure 6:
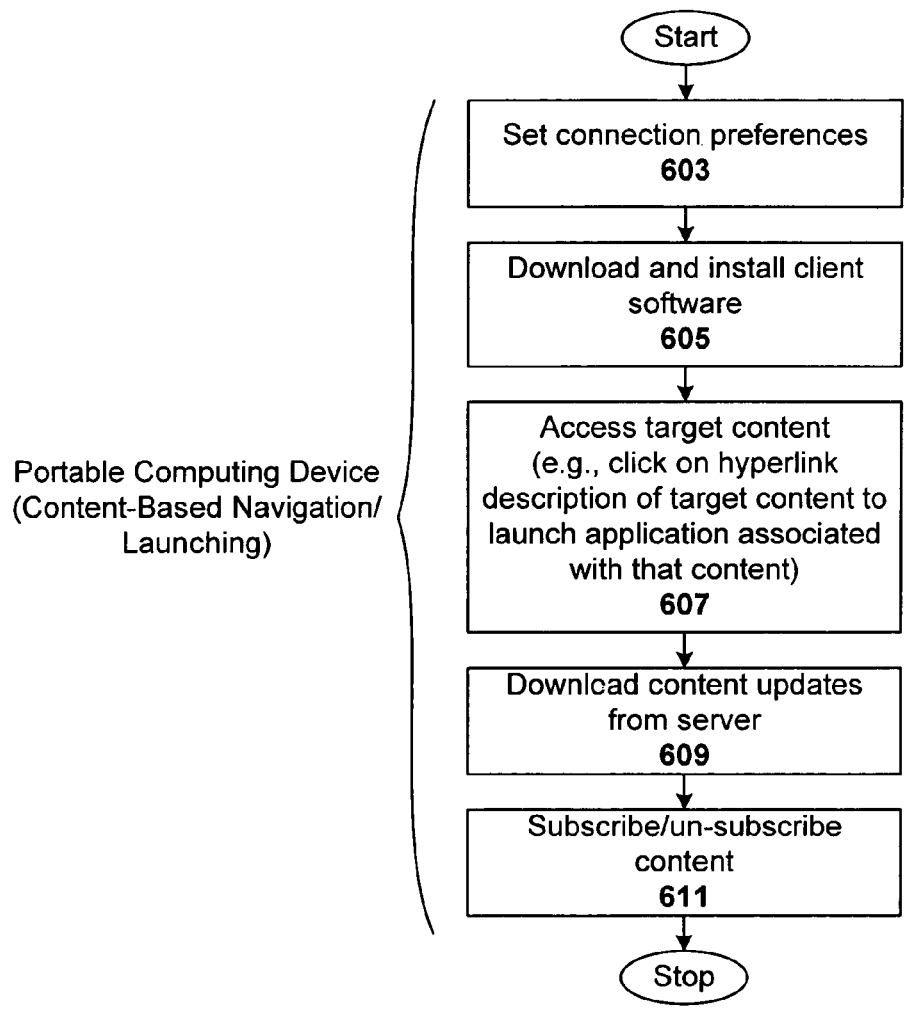
FIG. 6 illustrates a method for enabling content-based navigation and launching on portable computing devices, in accordance with another embodiment of the present invention.

FIG. 6 illustrates a method for generating content so as to enable content-based navigation and launching on portable computing devices, in accordance with another embodiment of the present invention. This method can be carried out, for example, by the portable computing device 110 of FIGS. 1 and 2b. The user can be, for example, a local administrator or the employee of an enterprise/company or other consumer. The user can perform any one or combination of these functions (603, 605, 607, 609, and 611), and not necessarily in sequence shown, as will be appreciated in light of this disclosure.

The method may include setting 603 connection preferences (for connecting to server 115). In one particular embodiment, this is achieved as follows: power on the portable computing device 110 if not already on; press the programmed or otherwise designated button on the keypad to launch the content navigator 288; use the drop-down menu from the content navigator 288 main screen to select the preferences option; update the server 115 connection parameters as necessary (e.g., using checkbox scheme or other suitable user interface); click on the save button to save the changes; and upon completion of the download, exit the content navigator 288 and resume other functions on the portable computing device 110.

The method may include downloading and installing 605 client software. In one particular embodiment, this is achieved as follows: power on the portable computing device 110 if not already on; press the programmed or otherwise designated button on the keypad to launch the content navigator 288; use the drop-down menu from the content navigator 288 main screen to select the download option; if the connection to the server 115 is established, a list of client software that is not installed on the portable computing device 110 is displayed (e.g., after scanning device 110 for installed client software); check or otherwise select the items that are required for download; click on the download button to begin download; and upon completion of the download, exit the content navigator 288 and resume other functions on the portable computing device 110.

The method may include accessing 607 target content. In one particular embodiment, this is achieved as follows: power on the portable computing device 110 if not already on; press the programmed or otherwise designated button on the keypad of device 110 to launch the content navigator 288; use the drop-down menu (or popup category screens) from the content navigator 288 main screen to navigate to the target content (e.g., based on the content description, such as "Sales Report"); click on the hyperlink description of the target content to launch the application associated with that content; and press the designated button on the keypad of device 110 to get back to the content navigator 288, once done viewing or otherwise using the target content.

The method may include downloading 609 content updates (from server 115). In one particular embodiment, this is achieved as follows: power on the portable computing device 110 if not already on; press the programmed or otherwise designated button on the keypad of device 110 to launch the content navigator 288; use the drop-down menu from the content navigator 288 main screen to select the update option; if the connection to the server 115 is established, a list of queued downloadable content items is displayed (e.g., each item having a checkbox or other suitable user interface selection mechanism); check or otherwise select the content items that are required for download; click on the update button to begin download; and upon completion of the download, exit the content navigator 288 and resume other functions on the portable computing device 110.

The method may include subscribing/un-subscribing 611 content. In one particular embodiment, this is achieved as follows: power on the portable computing device 110 if not already on; press the programmed or otherwise designated button on the keypad of device 110 to launch the content navigator 288; use the drop-down menu from the content navigator 288 main screen to select the personalize option; if the connection to the server 115 is established, an authentication window is displayed (e.g., requiring username/password input from user); enter user credentials for authentication; upon successful login, display existing personal choices; subscribe/un-subscribe content choices from the available options (e.g., using checkbox scheme or other suitable user interface); upon completion of the subscribe/un-subscribe content process, click the download button and synchronize the personalized content selection to the portable computing device 110; and upon completion of the download, exit the content navigator 288 and resume other functions on the portable computing device 110.

As will be appreciated in light of this disclosure, a number of user interfaces (e.g., checkboxes, pull-down menus, popup category screens, buttons, etc) can be used in carrying out the functionality described herein, and the present invention is not intended to be limited to any one such configuration. Rather, numerous user interface and implementation schemes can be used in accordance with various embodiments of the present invention.

In addition, each of the modules or components discussed herein can be implemented, for example, in software (e.g., C++ and/or JavaScripts) or a combination of hardware and software (e.g., multiport microcontroller with programmed routines for the content personalization engine and content production engine for the server 115 embodiment, or the content navigator for the portable computing device embodiment) to carryout the described functionality. Likewise, various embodiments of the present invention can be implemented as a set of instructions encoded on a machine readable medium, wherein upon execution of those instructions, functionality described herein is carried out.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A portable computing device with telecommunications capability, the portable computing device configured for content-based navigation and launching on a portable computing device, comprising:
    a communication interface communicating with a host computing device and a server, the server distinct from the host computing device; and
    a content navigator module adapted to:
        receive a configuration of a content-based launching pad from the host computing device, the configuration including two or more user-categories as defined by a user of the portable computing device, the content-based launching pad grouping links to digital content files into the two or more user-created categories for display within a single launching area in a screen of the portable computing device, at least one of the categories comprising a first link to a first digital content file executed by a first application and a second link to a second digital content file executed by a second application;
        provide for displaying an application-based launching pad on the area of the screen of the portable computing device, the application-based launching pad grouping the links to the digital content files based on applications for accessing the digital content files;
        toggle to provide display for the content-based launching pad on the area of the screen of the portable computing device responsive to receiving a first user input selecting the content-based launching pad for display on the screen; and
        receive a selected digital content file in the content-based launching pad from the server responsive to receiving a second user input representing selection and launching of the selected digital content file.

2. The device of claim 1 wherein the links to the digital content files include hyperlink descriptions of the content files, and responsive to receiving the second user input selecting one of the hyperlink descriptions, the content navigator module launching an application associated with the selected hyperlink description.

3. The device of claim 1 wherein the digital content files are grouped into user-created categories, the content files of the user-created categories executable across multiple operating systems at least two of which are distinct from each other.

4. The device of claim 1 wherein the portable computing device is one of a personal digital assistant (PDA), a cellular telephone, or a smart phone.

5. The device of claim 1 wherein the portable computing device is a hand-held mobile device configured to communicate by a wireless network.

6. The device of claim 1 further comprising a database of choices and preferences relative to a personalized content-based navigation and launching scheme of the user.

7. The device of claim 1 wherein the first application comprises at least one of a generic document viewer, an application, a media player, a browser, and a reader.

8. A method of navigating and launching digital content files on a portable computing device with telecommunication capability, comprising:
    receiving a configuration of a content-based launching pad from a host computing device, the configuration including two or more user-categories as defined by a user of the portable computing device, the content-based launching pad grouping links to digital content files into the two or more user-created categories for display within a single launching area in a screen of the portable computing device, at least one of the categories comprising a first link to a first digital content file executed by a first application and a second link to a second digital content file executed by a second application;
    providing for displaying an application-based launching pad on the area of the screen of the portable computing device, the application-based launching pad grouping the links to the digital content files based on applications for accessing the digital content files;
    toggling to provide display for the content-based launching pad on the screen of the portable computing device responsive to receiving a first user input selecting the content-based launching pad for display on the screen; and
    receiving a selected digital content file in the content-based launching pad from a server responsive to receiving a second user input representing selection and launching of the selected digital content file.

9. The method of claim 8 wherein the links to the digital content files include hyperlink descriptions of content, and further comprising launching an application associated with the selected hyperlink description responsive to receiving the second user input selecting one of the hyperlink descriptions.

10. The method of claim 8 further comprising storing choices and preferences related to a personalized content-based navigation and launching scheme of the user in a database of the portable computing device.

11. A computer-readable storage medium storing instructions thereon, the instructions, when executed by a processor in a portable computing device with telecommunication capability, cause the processor to:

receive a configuration of a content-based launching pad from a host computing device, the configuration including two or more user-categories as defined by a user of the portable computing device, the content-based launching pad grouping links to digital content files into the two or more user-created categories for display within a single launching area in a screen of the portable computing device, at least one of the categories comprising a first link to a first digital content file executed by a first application and a second link to a second digital content file executed by a second application;

provide for displaying an application-based launching pad on the area of the screen of the portable computing device, the application-based launching pad grouping the links to the digital content files based on applications for accessing the digital content files;

toggle to provide display for the content-based launching pad on the screen of the portable computing device responsive to receiving a first user input selecting the content-based launching pad for display on the screen; and receive a selected digital content file in the content-based launching pad from a server responsive to receiving a second user input representing selection and launching of the selected digital content file.

12. The computer-readable storage medium of claim 11 wherein each category of the content-based launching pad includes one or more hyperlink descriptions of content, and further comprising instructions to launch an application associated with the selected hyperlink description responsive to receiving the second user input selecting one of the hyperlink descriptions.

13. The computer-readable storage medium of claim 11 further comprising instructions to store choices and preferences related to a personalized content-based navigation and launching scheme of the user in a database of the portable computing device.

* * * * *